United States Patent
Raspati et al.

(10) Patent No.: US 11,735,860 B2
(45) Date of Patent: Aug. 22, 2023

(54) VEHICLE PROVIDED WITH A HYDROGEN TANK, CONTAINING AT LEAST ONE ELECTRICAL CONNECTION DEVICE

(71) Applicant: Airbus Operations (S.A.S.), Toulouse (FR)

(72) Inventors: Olivier Raspati, Toulouse (FR); Thomas Jomier, Toulouse (FR); David Rousset, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 257 days.

(21) Appl. No.: 17/121,164

(22) Filed: Dec. 14, 2020

(65) Prior Publication Data
US 2021/0184392 A1     Jun. 17, 2021

(30) Foreign Application Priority Data
Dec. 16, 2019   (FR) ...................................... 1914460

(51) Int. Cl.
| H01R 13/53 | (2006.01) |
| H01H 1/66 | (2006.01) |
| B64D 37/06 | (2006.01) |
| B64D 37/30 | (2006.01) |

(52) U.S. Cl.
CPC ............. *H01R 13/53* (2013.01); *B64D 37/06* (2013.01); *B64D 37/30* (2013.01); *H01H 1/66* (2013.01); *H01R 2201/26* (2013.01)

(58) Field of Classification Search
CPC .... H01R 13/53; H01R 2201/26; B64D 37/06; B64D 37/30; B60R 16/02; H01H 1/66; H01H 1/58; H01H 33/64; H01H 2050/025; H01H 9/30; H03K 17/082

USPC .......................................................... 218/155
See application file for complete search history.

(56) References Cited

U.S. PATENT DOCUMENTS

| 2,725,446 | A | 11/1955 | Slepian | |
| 2,997,563 | A | 8/1961 | Smith et al. | |
| 6,291,786 | B1 * | 9/2001 | Gericke | H01H 33/027 174/18 |
| 9,527,569 | B2 * | 12/2016 | Fournier | C25B 15/08 |
| 10,102,991 | B2 | 10/2018 | Kanematsu et al. | |
| 10,300,788 | B2 * | 5/2019 | Nishiumi | B60K 15/03006 |
| 2013/0306797 | A1 * | 11/2013 | Dalle Donne | B64D 37/12 244/135 R |
| 2015/0336680 | A1 * | 11/2015 | Schumacher | F17C 3/00 244/135 B |
| 2015/0344144 | A1 * | 12/2015 | Kamath | F02C 7/236 244/135 C |

(Continued)

OTHER PUBLICATIONS

French Search Report for Application No. 1914460 dated Sep. 17, 2020.

*Primary Examiner* — William A Bolton
(74) *Attorney, Agent, or Firm* — KDW Firm PLLC

(57) ABSTRACT

Use of a hydrogen tank of a vehicle such as an aircraft for protecting at least one electrical connection device linked to at least one electrical device. At least one connection device is placed in a tank or in a sealed enclosure supplied with hydrogen by a tank or by any other source of hydrogen supply of the vehicle. The use of a tank that already exists in the vehicle makes it possible to avoid having to use specific chambers incorporated in a complex manner with the connection device.

20 Claims, 2 Drawing Sheets

(56) References Cited

U.S. PATENT DOCUMENTS

| | | | |
|---|---|---|---|
| 2016/0036071 A1* | 2/2016 | Klewer | H01M 8/04044 |
| | | | 429/435 |
| 2017/0088289 A1* | 3/2017 | Tovazzi | G01M 5/0016 |
| 2017/0341769 A1* | 11/2017 | Haberbusch | B64D 39/06 |
| 2017/0368769 A1* | 12/2017 | Baumbach | G01F 23/263 |
| 2018/0033274 A1* | 2/2018 | Kim | B60Q 1/52 |
| 2018/0375505 A1 | 12/2018 | Handy et al. | |
| 2019/0081343 A1* | 3/2019 | Jung | F02M 37/0047 |

\* cited by examiner

VEHICLE PROVIDED WITH A HYDROGEN TANK, CONTAINING AT LEAST ONE ELECTRICAL CONNECTION DEVICE

CROSS-REFERENCE TO RELATED APPLICATION

This application claims priority to French patent application number 19 14460 filed on Dec. 16, 2019, the entire disclosure of which is incorporated by reference herein.

TECHNICAL FIELD

The disclosure herein relates to the field of electrical connection devices as applied to a vehicle, and more particularly an aircraft, comprising a hydrogen tank.

BACKGROUND

An aircraft contains many electrical circuits, and more particularly commutators, switches, circuit breakers or the like. In the event of heavy overloads for example, an ionization of the air can occur creating a field in which the electricity can circulate and cause undesirable electrical arcs between the contactors of the circuit.

U.S. Ser. No. 10/102,991 discloses a contactor having a fixed contact and a movable contact disposed in a hermetically sealed receptacle filled with hydrogen. In the case of application to an aircraft, it would be advantageous to provide certain contactors with such a receptacle but that would result in a significant weight increase which is precisely a parameter that is sought to be reduced, notably because of the increase in fuel consumption which increases with the weight of the aircraft.

An aim of the disclosure herein is a system that makes it possible to avoid electrical arcs in such electrical circuits, even more widely in connection devices as described below that are sought to be protected while avoiding increasing the weight of the vehicle.

To this end, the disclosure herein relates to a vehicle provided with at least one hydrogen tank comprising at least one electrical connection device linked to at least one electrical device, wherein at least one connection device is placed in a hydrogen tank or in a sealed enclosure supplied with hydrogen by a tank or by any other source of hydrogen supply of the vehicle.

The use of a tank that already exists in the vehicle or of an enclosure supplied with hydrogen makes it possible to avoid having to use specific chambers incorporated in a complex manner with the connection device.

SUMMARY

The disclosure herein provides at least one of the following optional features, taken alone or in combination.

At least one module is placed in the tank or in the enclosure.

The set of connection devices constituting an electrical system is placed in the tank or the enclosure.

Apertures are provided respectively in the tank or the enclosure for the passage of elements allowing the link between the connection device and, directly or indirectly, the devices.

The vehicle is an aircraft.

The connection devices are distribution and protection components of an electrical core of the aircraft.

BRIEF DESCRIPTION OF THE DRAWINGS

Other aims, features and advantages will emerge from the following description of the disclosure herein, a description given as a purely nonlimiting example, with reference to the attached drawings in which.

DETAILED DESCRIPTION

The disclosure herein is illustrated hereinbelow with the example of an aircraft with hydrogen tank 2. However, it is not limited to that application and can relate to any type of vehicle with a hydrogen tank of motor vehicle, ship, train or other type. Hydrogen is used to supply engines that propel the aircraft or even for the operation of fuel cells ensuring the supply of electrical energy to multiple onboard devices or any other application.

Figure 1:
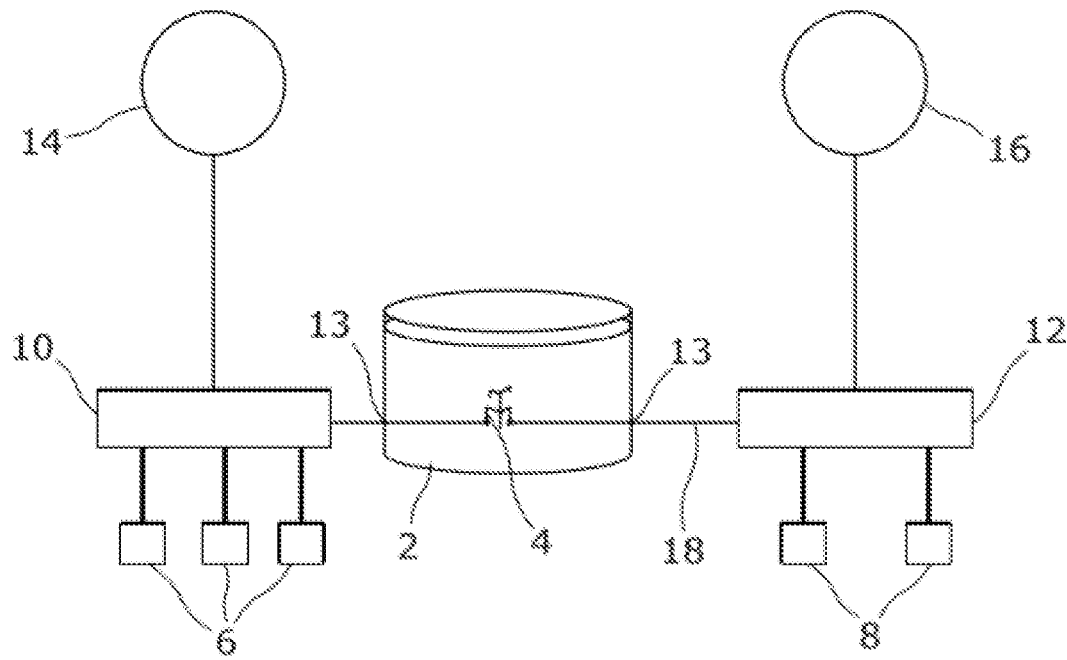
FIG. 1 is a schematic view of a connection device between two electrical conductors each associated with several devices of a vehicle, which is, in the example illustrated, an aircraft, the connection device being immersed in a hydrogen tank of the aircraft.

As illustrated in FIG. 1, the concept of the disclosure herein is to use the hydrogen tank or tanks 2 of the aircraft that already exist as receptacle filled with hydrogen to protect connection devices 4. Throughout the rest of the description, the term "connection device" covers any electrical connection device between devices, a device being taken in the broad sense, namely any system directly or indirectly connected with an electrical power source, the device encompassing the power source itself. In the application illustrated, the devices are those of an aircraft and are therefore very numerous and varied; to give a few examples thereof, they can include a computer embedded in the cockpit, a display screen, an auxiliary power unit, etc. The connection devices also vary widely and comprise devices that make it possible to make or break an electrical connection of commutator, switch, circuit breaker, contactor, relay or other type; these will be referred to by the term "connection control device". The connection devices can also make it possible to conduct and distribute the electrical current, such as, for example, a busbar, an electrical cable, and will, more particularly hereinbelow, be termed conductors. Also hereinbelow, a set of connection devices, namely at least two, will be called an electrical module 5. That can for example be a connection control device and a conductor. In the figures, the connection devices 4 and electrical modules 5 illustrated are those allowing electrical distribution and protection onboard an aircraft: the entire assembly to which these connection devices belong in this application is called electrical core.

The connection devices, individual or in module form, are introduced into at least one sealed enclosure supplied with hydrogen without having to modify them as in the prior art cited above. There is no need to provide each connection device 4 with a hermetic switching chamber filled with hydrogen and therefore to have to modify the conventional devices. They simply have to be immersed in the environment of the already existing tank without having to make modifications thereto or only slight modifications as will be seen in certain embodiments hereinafter in the description, namely only as applied to the tank and much less numerous and complex.

As represented in FIGS. 1 through 4, the electrical devices 6 and 8 are linked by conductors 10 and 12 such as cables, busbar or the like to electrical power sources 14, 16. Between the conductors 10 and 12 there is a connection control device 4. As seen above, the connection control device 4 is a generic term encompassing any device that makes it possible to make or break an electrical connection bearing in mind that the connection control device can have different additional functions depending on the configuration case. If the purpose is to break or restore the connection on demand, the connection control device corresponds to a switch. If the function is to cut, establish, restore, reverse, distribute, switch the current, the connection control device corresponds to a commutator. If the function is to break a current in the event of an incident, the connection control device corresponds to a circuit breaker. The common function is to connect or disconnect two electrical devices, here the two conductors 10, 12.

According to a first embodiment, at least one connection control device 4 is immersed in a hydrogen tank 2 (first embodiment) proper of the aircraft or in several of them if such exist. It is also possible to provide at least one sealed enclosure 20 supplied with hydrogen by the tank or tanks 2 or any other possible source of hydrogen supply in the aircraft (second embodiment). The enclosures are then for example placed in determined zones of the aircraft within which there are one or more devices 4. The connection control devices 4 to be protected can be selected according to the desired level of safety and their location.

According to an example of the first embodiment illustrated in FIG. 1, a connection control device 4 of the vehicle, here the aircraft (or connection devices bearing in mind that, in the example illustrated, it is a single device), is placed in a hydrogen tank 2 of the aircraft. The hydrogen tank 2 of the aircraft can be, for example, that used to supply an engine. It is necessary to provide at least one aperture 13 in the tank 2 for the tight passage of the elements 18 allowing the link between the connection device 4 and the conductors 10 and 12. The way in which the aperture 13 is produced so that the tank remains sealed will be not described because it is known.

Figure 2:
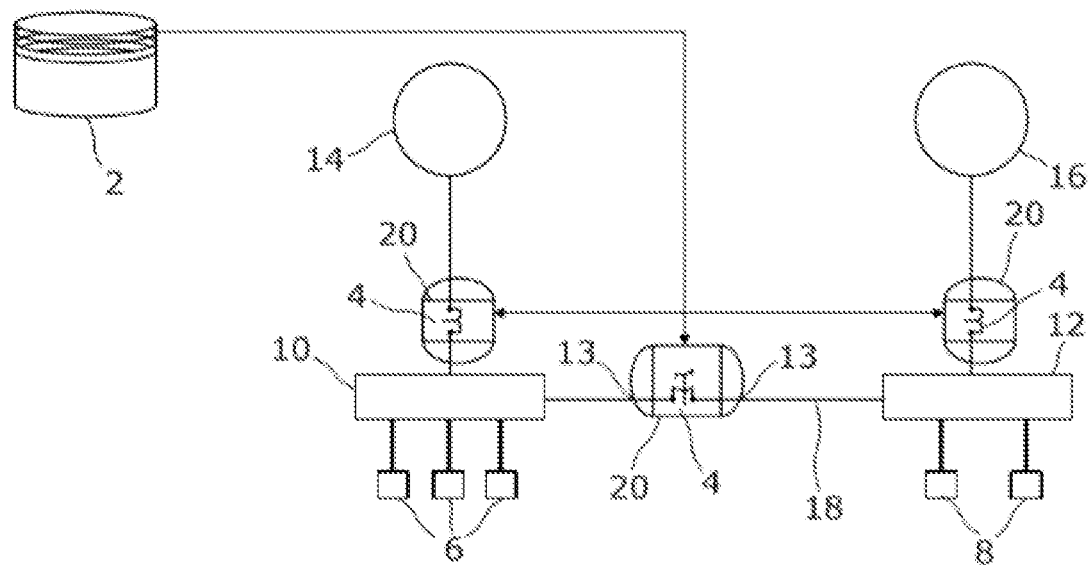
FIG. 2 is a schematic view of several connection devices between, respectively, two electrical conductors or one conductor and a power source, each conductor being associated with several devices of a vehicle, which is, in the example illustrated, an aircraft, the connection devices being immersed in a sealed enclosure supplied by a hydrogen tank.

According to the second embodiment illustrated in FIG. 2, the connection control devices 4 are placed in sealed enclosures 20 supplied with hydrogen by the tank 2. In order to optimize the architecture, it is possible to determine the location of each enclosure 20 in the aircraft so that the enclosure is positioned as close as possible to the location of the device 4 or, in the case of a plurality of devices 4, optimally with respect to the locations thereof. In the same way as previously, the enclosure 20 is provided with apertures 13 of known type for the tight passage of the elements 18 allowing the link between the connection control device 4 and, respectively, the conductors 10, 12 and the power sources 14, 16.

According to a second embodiment, so as to limit the number of apertures 13 in the tank 2 or in several of them if such exist, or the number of enclosures 20 to be provided, at least one module 5 and, optimally, a complete set of connection devices like that consisting of or comprising the distribution and protection components of the electrical core, is placed in a tank 2 (first embodiment) of the aircraft or a sealed enclosure 20 supplied with hydrogen (second embodiment) by a tank 2 or any other embedded source of hydrogen supply.

Figure 3:
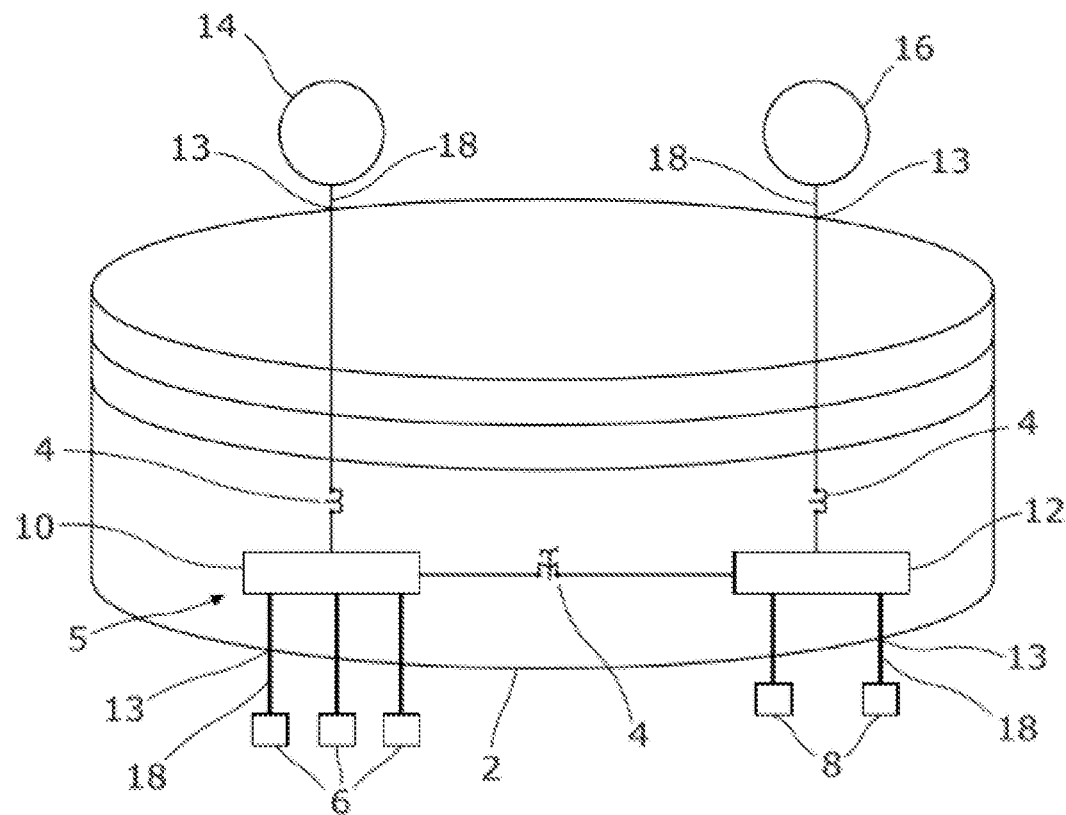
FIG. 3 is a schematic view of several connection devices between, respectively, two electrical conductors or one conductor and a power source, each conductor being associated with several devices of a vehicle, which is, in the example illustrated, an aircraft, the connection devices and the electrical conductors being immersed in a hydrogen tank of the aircraft.

As represented in FIG. 3 (first embodiment), a module 5 comprising two conductors 10, 12 and three connection control devices 4 is disposed inside a hydrogen tank 2 of the aircraft. The devices 6, 8 linked to the conductors 10, 12 and the power sources 14, 16 linked to the connection control devices 4 remain outside the tank. Apertures 13 are provided in the tank 2 for the tight passage of the elements 18 allowing the link between the conductors 10, 12 and the devices 6, 8 and, indirectly, via the connection control devices, the power sources 14, 16 or, more specifically, directly between the connection control devices 4 and the power sources 14, 16.

Figure 4:
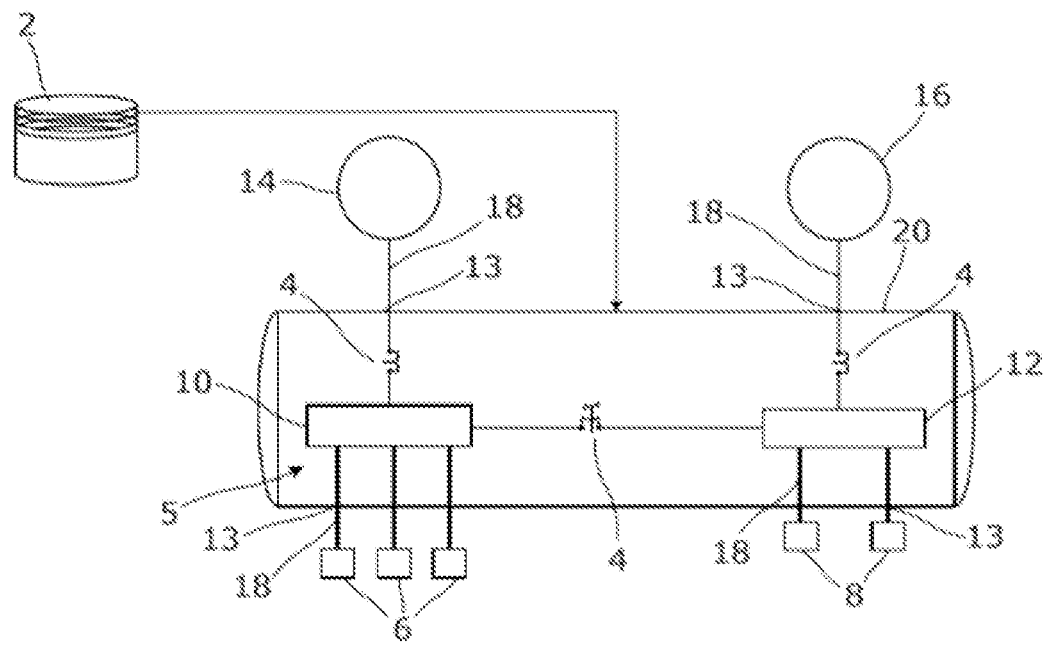
FIG. 4 is a schematic view of several connection devices between, respectively, two electrical conductors or one conductor and a power source, each conductor being associated with several devices of a vehicle, which is, in the example illustrated, an aircraft, the connection devices and the electrical conductors being immersed in a sealed enclosure supplied by a hydrogen tank of the aircraft.

As represented in FIG. 4 (second embodiment), it is alternatively possible to provide a sealed enclosure 20 supplied with hydrogen. In the same way as in FIG. 3, a module 5 comprising two conductors 10, 12 and three connection control devices 4 is disposed in one and the same sealed enclosure 20 supplied with hydrogen by the tank 2. Apertures 13 are produced in the enclosure 20 for the tight passage of the elements 18 allowing the link between the conductors 10, 12 and the devices 6, 8 and also allowing the link between the conductors 10, 12 and the power sources 14, 16.

In all the embodiments, all of the connection device is immersed in the tank 2 or the enclosure 20. The unit formed by the connection device is placed in this tank or this enclosure. Thus, often, components, most of them or even all of the components of a connection device, are housed in a housing, receptacle or equivalent, called housing hereinbelow. The tank or the enclosure concerned is not the housing of the connection device: the connection device including its housing if such exists is all introduced into the tank.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vehicle comprising:
   at least one hydrogen tank;
   one or more electrical devices;
   one or more electrical power sources;

at least one electrical connection device linked between at least one of the one or more electrical devices and at least one of the one or more electrical power sources;
wherein the at least one electrical connection device is in the at least one hydrogen tank; and
wherein the at least one electrical connection device is configured to selectively break or restore an electrical connection with the at least one of the one more electrical devices and the at least one of the one or more electrical power sources with which the at least one electrical connection device is linked.

2. The vehicle according to claim 1, wherein the at least one electrical connection device is a plurality of electrical connection devices in a form of a module, which is in the at least one hydrogen tank.

3. The vehicle according to claim 2, wherein the plurality of electrical connection devices constitutes an electrical system and is in the at least one hydrogen tank.

4. The vehicle according to claim 3, wherein the plurality of electrical connection devices are distribution and protection components of an electrical core.

5. The vehicle of claim 1, wherein the vehicle comprises an aircraft.

6. The vehicle according to claim 1, wherein the at least one hydrogen tank comprises apertures for passage of elements therethrough to allow the at least one electrical connection device to be linked to the one or more electrical devices.

7. The vehicle according to claim 1, comprising at least one electrical conductor that is electrically connected between the at least one electrical connection device and the at least one of the one or more electrical devices with which the at least one electrical connection device is linked.

8. The vehicle according to claim 7, wherein:
the one or more electrical devices comprises a first electrical device and a second electrical device;
the one or more electrical power sources comprises a first electrical power source and a second electrical power source;
the at least one electrical connection device comprises a first electrical connection device and a second electrical connection device;
the at least one electrical conductor comprises a first electrical conductor and a second electrical conductor;
the first electrical power source is connected, through the first electrical connection device and the first conductor in series, to the first electrical device; and
the second electrical power source is connected, through the second electrical connection device and the second conductor in series, to the second electrical device; the vehicle comprising:
a third electrical connection device that is connected between the first and second conductors, wherein the third electrical connection device is in the at least one hydrogen tank and is configured to selectively break or restore an electrical connection between the first and second conductors.

9. The vehicle according to claim 8, wherein the first and second conductors and the first, second, and third electrical connection devices are within the at least one hydrogen tank.

10. The vehicle according to claim 9, wherein the at least one hydrogen tank comprises apertures for passage of elements therethrough, each of the apertures being formed to provide a respective electrical connection between one or more of:
the first electrical power source and the first electrical connection device;
the second electrical power source and the second electrical connection device;
the first conductor and the first electrical device; and
the second conductor and the second electrical device.

11. The vehicle of claim 10, wherein the vehicle comprises an aircraft.

12. A vehicle comprising:
at least one hydrogen tank;
one or more electrical devices; and
at least one electrical connection device linked to the one or more electrical devices;
wherein the at least one electrical connection device is in a sealed enclosure of the vehicle, the sealed enclosure being supplied with hydrogen by the at least one hydrogen tank or any other source of hydrogen on the vehicle; and
wherein the at least one electrical connection device is configured to selectively break or restore an electrical connection with the respective one of the one more electrical devices with which the at least one electrical connection device is linked.

13. The vehicle according to claim 12, wherein the at least one electrical connection device is a plurality of electrical connection devices in a form of a module, which is in the sealed enclosure.

14. The vehicle according to claim 13, wherein the plurality of electrical connection devices constitutes an electrical system and is in the sealed enclosure.

15. The vehicle according to claim 14, wherein the plurality of electrical connection devices are distribution and protection components of an electrical core.

16. The vehicle according to claim 12, wherein the sealed enclosure comprises apertures for passage of elements therethrough to allow the at least one electrical connection device to be linked to the one or more electrical devices.

17. The vehicle according to claim 12, comprising at least one electrical conductor that is electrically connected between the at least one electrical connection device and the at least one of the one or more electrical devices with which the at least one electrical connection device is linked.

18. The vehicle according to claim 17, wherein:
the one or more electrical devices comprises a first electrical device and a second electrical device;
the one or more electrical power sources comprises a first electrical power source and a second electrical power source;
the at least one electrical connection device comprises a first electrical connection device and a second electrical connection device;
the at least one electrical conductor comprises a first electrical conductor and a second electrical conductor;
the first electrical power source is connected, through the first electrical connection device and the first conductor in series, to the first electrical device; and
the second electrical power source is connected, through the second electrical connection device and the second conductor in series, to the second electrical device; the vehicle comprising:
a third electrical connection device that is connected between the first and second conductors, wherein the third electrical connection device is in the sealed enclosure and is configured to selectively break or restore an electrical connection between the first and second conductors.

19. The vehicle according to claim 18, wherein the first and second conductors and the first, second, and third electrical connection devices are within the sealed enclosure.

20. The vehicle according to claim 19, wherein the sealed enclosure comprises apertures for passage of elements therethrough, each of the apertures being formed to provide a respective electrical connection between one or more of:
- the first electrical power source and the first electrical connection device;
- the second electrical power source and the second electrical connection device;
- the first conductor and the first electrical device; and
- the second conductor and the second electrical device.

\* \* \* \* \*